Nov. 1, 1938. N. TESTI 2,134,960
SHAVING IMPLEMENT
Filed June 12, 1936
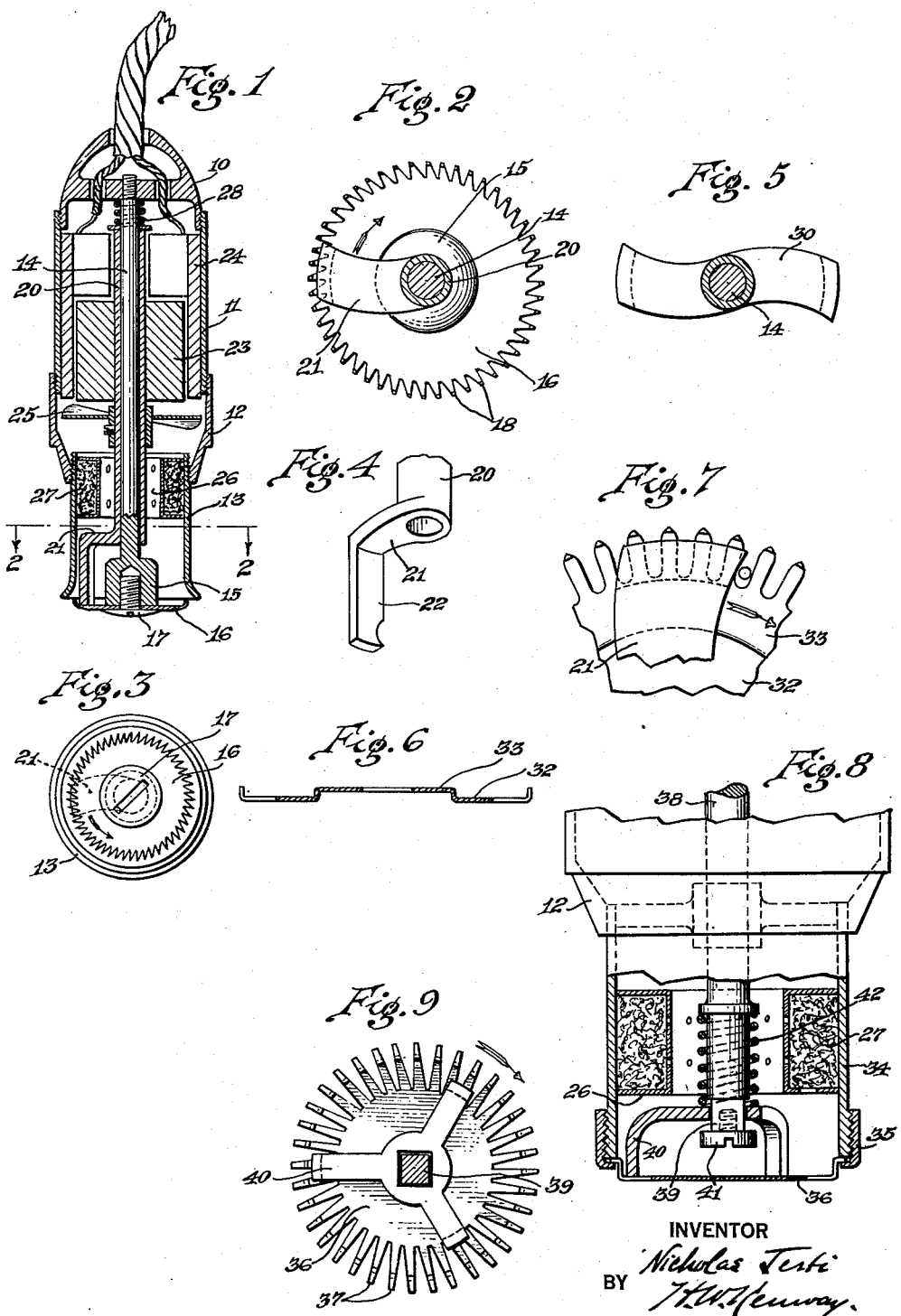
INVENTOR
Nicholas Testi
BY
ATTORNEY Patented Nov. 1, 1938

2,134,960

UNITED STATES PATENT OFFICE 2,134,960

SHAVING IMPLEMENT

Nicholas Testi, Boston, Mass., assignor to Gillette Safety Razor Company, Boston, Mass., a corporation of Delaware Application June 12, 1936, Serial No. 84,938

14 Claims. (Cl. 30—43)

This invention relates to implements of the rotary type employing co-operating shearing members for shaving, preferably without the use of lather.

An important feature of the invention consists in a combined guard and shearing member of thin sheet metal having a circularly arranged series of teeth formed with their shearing edges disposed radially, or substantially radially, with a result that the user may rely upon close and uniform shaving action at all different points of the guard which may be brought into operative relation with his skin. The guard is stationary in the implement and co-operates with a rotary cutter having one or more blades and which is readily replaceable when worn or dulled in use.

The implement as herein shown is provided with a fan arranged to discharge a current of air between or about the shearing teeth of the guard. An optional feature of the invention consists in a receptacle for absorbent material which may be saturated with perfume or a volatile antiseptic and thus supply vapor to be picked-up by the air current and delivered against the skin of the user during the shaving operation. In those implements which include a built-in motor in their organization, the fan may be utilized also to cool the motor.

Other features of the invention relate more particularly to details of mechanical construction; for example, in one embodiment of my invention it is proposed to employ a stationary shaft secured within one end of the casing and carrying at its free end the stationary guard and shearing member. As herein shown, this shaft is also utilized as a journal for the rotary shearing element, for the fan and for the rotor or armature of the motor thus supplying a compact and mechanically efficient mechanism.

Another novel and optional feature of the invention consists in a rotary shearing cutter having a plurality of blades arranged to travel in adjacent concentric paths. A particularly rapid and smooth cutting effect is thereby secured in the implement and the requirements of accurate construction are considerably relaxed so that both rotary cutter and guard may be constructed at relatively low cost. Moreover, the resulting construction is compact and the sub-division of the cutter reduces friction and heating in the implement.

These and other features of the invention will be best understood and appreciated from the following description of two preferred embodiments thereof, selected for purposes of illustration and shown in the accompanying drawing, in which,—

Fig. 1 is a view of the implement in longitudinal section;

Fig. 2 is a view in cross-section on the line 2—2 of Fig. 1 on an enlarged scale and omitting the outer thimble;

Fig. 3 is an end view of the implement;

Fig. 4 is a view of the cutter in perspective on an enlarged scale;

Fig. 5 is an end view showing a modified form of cutter;

Fig. 6 is a view in cross-section and on an enlarged scale of a modified form of guard;

Fig. 7 is a fragmentary view of the guard shown in Fig. 6 and a portion of the cutter;

Fig. 8 is a view in longitudinal cross-section of an implement of modified construction; and Fig. 9 is a view of the cutter and guard from inside the implement.

The implement illustrated in Figs. 1 to 4 is provided with a casing made up of four parts, a base 10 having convex walls tapering toward one end, a barrel 11 threaded in connection with the base, a cylindrical collar 12 threaded upon the barrel and tapering toward the outer end of the implement, and finally a cylindrical thimble 13 threaded into the small end of the collar 12 and flared at its extreme outer end. The base 10 is hollow in construction and has a transverse web into which is threaded the inner end of a stationary shaft 14. The shaft extends longitudinally throughout the casing being provided at its free end with an enlarged boss 15 to which is secured a circular disk 16 of thin sheet steel by means of a screw 17 threaded into the end of the boss 15. The disk 16 acts as a guard and as a shearing member and is provided with radial or substantially radial shearing teeth 18 about its circumference, as best shown in Fig. 2. The teeth 18 are arranged in a circular marginal zone about the circumference of the disk 16 while, except for a central perforation, the remainder of the disk is solid. The ends of the teeth 18 are curved inwardly so that as a guard disk it presents a smooth outer surface to the face of the user. The ends of the teeth 18 lie slightly within the flange of the thimble 13 and the guard 16 thus substantially closes the end of the casing. The forward edge of each of the shearing teeth 18 is radially disposed and thus, at whatever portion of the guard is presented to the face of the user, the shearing action is the same.

Co-operating with the stationary disk 16 is a rotary cutter which is secured to or formed as a part of a long sleeve 20 journaled upon the shaft 14 and provided near its lower end with a radial arm 21. From the end of this arm projects the upstanding cutter blade 22 and this is recessed in its advancing edge, as best shown in Fig. 4, to provide an acute shearing angle for its advancing radially disposed shearing edge. The cutter is rotated at high speed with the end of the blade 22 bearing lightly against the inner flat face of the disk 16 beneath and in co-operation with the shearing teeth 18.

The cutter sleeve 20 carries a rotor or armature 23 rotating within the stationary field magnets 24 which are pressed inside the barrel 11 of the casing. Energy is supplied to the motor by leads which enter the implement through the end of the hollow base 10.

Secured to the rotary sleeve 20 below armature 23 is a fan 25 which is so set as to draw air through the motor and expel it about the guard. Within the inner end of the thimble 13 is placed a perforated annular cartridge 26 containing absorbent material 27 and this may be saturated with perfume or a volatile antiseptic. The result of this arrangement is that when the cutter is in operation air will be drawn into the base of the implement, warmed in passing through the motor and charged with vapor in passing through cartridge 26. The vapor-ladened air is thus delivered against the face of the user with beneficial or pleasing results.

The cutter shown in Fig. 4 comprises a single blade 22 but if preferred, a twin blade cutter 30, such as that shown in Fig. 5, may be employed. In either case, it will be understood that the end or ends of the cutter blades revolve at high speed in contact with the inner face of the shearing teeth of the disk 16. The two shearing members are maintained in shearing relation to each other by means of a compression spring 28 which is interposed between the web of the base 10 and inner end of the cutter sleeve 20 and acts to urge the cutter sleeve 20 always outwardly in the implement.

An alternative form of guard is shown in Figs. 6 and 7 wherein the edges of the shearing teeth are made parallel with each other and with a central radial line, that is to say, the advancing edges of the teeth are tangent to a small concentric circle instead of being exactly radially in their direction as in the case of the guard of Fig. 2. The cutter 21 is shown in Fig. 7 as about to engage a hair against the shearing edge of one of the guard teeth. As is apparent from Fig. 6 the center portion of the guard 32 is shaped with a flat recessed portion 33 in which may be received the head of an attaching screw with the result that the end of the implement may present a flat contact surface to the face of the user instead of the convex contact surface presented by the implement of Figs. 1 to 3.

A somewhat modified form of implement is illustrated in Figs. 8 and 9 wherein the thimble 34 is shown as being provided with an external thread at its lower end for connection with a threaded retaining ring 35. The ring 35 is flanged to retain the flange of a thin sheet steel guard 36 provided with shearing teeth 37 as shown in Fig. 9, that is, the outer ends of the teeth 37, beyond the path of the cutter blades 40, are turned upwardly in a cylindrical wall and then outwardly forming a serrated annular flange which is engaged between the end of the thimble 34 and the inturned flange of the ring 35. Thus are the spaces between the teeth 37 extended uniformly into the peripheral portion of the guard so that in moving the guard over the face, the hairs may pass directly in through the peripheral wall of the guard into range of the cutter teeth 40.

In this instance, the implement is provided with a solid rotary shaft 38 having a squared end 39 upon which is mounted a three-armed cutter 40. The cutter is provided with a square central opening and is mounted somewhat loosely upon the squared end of the shaft 38, being urged into contact with the guard by a compression spring 42 which encircles the end of the shaft 38 and bears against a shoulder therein. As in the case of the implements above-described the ends of the cutter blade revolve beneath the teeth 37 of the guard and shear off the hairs which are brought into the teeth by the movement of the implement upon the skin of the user. As herein shown the radial cutter arms are of graduated length so that the cutter blades revolve in slightly overlapping concentric paths. The cutter is retained upon the square end 39 of the shaft 38 by a headed screw 41 and may be readily reached for removal or replacement by loosening the ring 35 sufficiently to release the flange of the guard, whereupon the screw is exposed and may be removed to free the cutter 40.

Having thus described my invention what I claim as new and desire to secure by Letters Patent of the United States is:—

1. A shaving implement comprising a casing, cooperative shearing instrumentalities mounted at one end of the casing, a rotary fan mounted in the casing, and a cartridge of absorbent material disposed between the fan and said instrumentality.

2. A shaving implement comprising a casing having a stationary internal shaft supported at one end therein, a shearing disk supported upon the free end of the shaft near the other end of the casing, a fan journaled upon said shaft, and an annular receptacle for absorbent material spaced from said shaft and disposed beneath the said shearing disk.

3. A shaving implement comprising an elongated casing, a power operated shaving device mounted in one end, a reservoir for a volatile liquid within the casing, and a fan for moving a current of air past the reservoir and then to discharge it adjacent to the shaving device.

4. A shaving implement comprising a cylindrical casing having a smooth outwardly flaring end, a toothed disk supported adjacent to the end of the casing and within the same, being separated therefrom by an annular space, and a cutter arranged to rotate upon the inner face of said disk.

5. A shaving implement including in its structure a toothed disk, and a rotary cutter having blades of graduated length arranged to travel in different concentric paths on one face of said disk.

6. A shaving implement of the rotary type comprising a stationary circular member having teeth about its circumference with shearing edges disposed substantially radially, and a cutter having arms of unequal length and blades arranged to rotate in concentric paths crossing different portions of said shearing edges.

7. A shaving implement of the rotary type comprising a tubular casing, a guard member having a substantially flat circular portion, an upstanding peripheral wall and an outwardly extending annular flange, said flat circular portion having openings forming approximately radial teeth therein, said wall having slots extending at right angles to the plane of said teeth and said annular flange being attached to said casing, and a cutter having a plurality of blades rotatable in contact with the inner face of the guard and inside its flange.

8. A shaving implement having a circular guard plate bounded by a cylindrical wall merging into an annular flange and having radial slots forming shearing teeth in its face, which slots extend continuously and uniformly through said bounding cylindrical wall and thereby afford passages for hairs to enter the guard plate in any direction through its circumferential edge, the guard plate being supported in the implement by its annular flange, and a cutter having spaced arms rotatably mounted within the guard plate.

9. A shaving implement comprising a cylindrical casing having a flat, perforated guard at one end and containing a motor having a shaft with a cutter thereon in shearing co-operation with the guard, a reservoir containing volatile liquid, and a fan located adjacent to the reservoir, within the guard and on the motor shaft.

10. A shaving implement including a casing having a perforated shearing plate at one end and containing a motor having a shaft and a rotary cutter therein, an annular reservoir for volatile liquid concentrically spaced from said shaft, and a fan on the motor shaft and located adjacent to one end of said reservoir.

11. A shaving implement including an outer casing having a cylindrical portion closed at its end by a shearing plate, a motor driven cutter within the casing co-operating with said plate, a container for volatile liquid having an inner perforated wall, and a motor driven fan arranged to direct an air current to said plate in passing the perforated wall of the container.

12. A shaving implement including an outer casing having a shearing plate and containing a motor driven cutter and fan, and absorbent material located inside the casing in the path of the air current induced by the fan and directed toward said shearing plate.

13. A shaving implement including in its structure a cylindrical casing, a motor driven cutter therein, and a circular shearing plate co-operating with the cutter and having its peripheral portion slotted and bent first upwardly to meet the end of the casing and then outwardly to provide a perforated annular flange coinciding substantially with the end of the casing.

14. A shaving implement comprising a cylindrical metal thimble having a smooth circular end edge, a disk supported adjacent to the end of the thimble and having a solid flat inner portion and a narrow circumferential zone of shearing teeth spaced within the end edge of the thimble, and a cutter having a blade arranged to rotate upon the inner face of the disk in co-operation with the shearing teeth thereof.

NICHOLAS TESTI.